(12) United States Patent
DiCaprio et al.

(10) Patent No.: US 9,702,995 B2
(45) Date of Patent: Jul. 11, 2017

(54) DOMAIN FREEZING IN JOINT INVERSION

(75) Inventors: Christopher DiCaprio, Houston, TX (US); Jan Schmedes, Bellaire, TX (US); Charlie Jing, Houston, TX (US); Garrett M. Leahy, Kerrville, TX (US); Anoop A. Mullur, Houston, TX (US); Rebecca L. Saltzer, Houston, TX (US)

(73) Assignee: ExxonMobil Upstream research Company, Houston, TX (US)

( * ) Notice: Subject to any disclaimer, the term of this patent is extended or adjusted under 35 U.S.C. 154(b) by 809 days.

(21) Appl. No.: 14/113,103

(22) PCT Filed: May 9, 2012

(86) PCT No.: PCT/US2012/037106
§ 371 (c)(1),
(2), (4) Date: Oct. 21, 2013

(87) PCT Pub. No.: WO2012/173718
PCT Pub. Date: Dec. 20, 2012

(65) Prior Publication Data
US 2014/0095131 A1    Apr. 3, 2014

Related U.S. Application Data

(60) Provisional application No. 61/498,352, filed on Jun. 17, 2011.

(51) Int. Cl.
*G06F 7/60* (2006.01)
*G06G 7/48* (2006.01)
(Continued)

(52) U.S. Cl.
CPC .............. *G01V 1/282* (2013.01); *G01V 11/00* (2013.01); *G01V 2003/086* (2013.01)

(58) Field of Classification Search
CPC ... G01V 99/005; G01V 11/00; G01V 2210/66
(Continued)

(56) References Cited

U.S. PATENT DOCUMENTS 4,742,305 A    5/1988    Stolarczyk
4,792,761 A    12/1988    King et al.
(Continued)

FOREIGN PATENT DOCUMENTS

GB    2 402 745    8/2005
GB    2 410 635    12/2006
(Continued)

OTHER PUBLICATIONS

Bunks, C., et al. (1995), "Multiscale seismic waveform inversion," *Geophysics* 50(5), pp. 1457-1473.
(Continued)

*Primary Examiner* — David Silver
(74) *Attorney, Agent, or Firm* — ExxonMobil Upstream Research-Law Department

(57) ABSTRACT

Method for estimating geological properties in a subsurface region using multiple types of geophysical data (21). An initial physical properties model 22 is constructed. Some parameters in the model are frozen (23) and optionally portions of the model wave number and spatial domains (24) and the data frequency and data time domains (25), are also frozen. Then, a joint inversion (26) of the multiple data types is performed to calculate an update to the model only for the portions that are not frozen. The converged model (27) for this inversion is used as a new starting model, and the process is repeated (28), possibly several times, unfreezing more parameters and data each time until the desired spatial and parameter resolution (29) has been achieved.

13 Claims, 4 Drawing Sheets

(51) Int. Cl.
*G01V 1/28* (2006.01)
*G01V 11/00* (2006.01)
*G01V 3/08* (2006.01)

(58) Field of Classification Search
USPC .................................................. 703/2, 10
See application file for complete search history.

(56) References Cited

U.S. PATENT DOCUMENTS

| | | |
|---|---|---|
| 4,831,383 A | 5/1989 | Ohnishi et al. |
| 4,875,015 A | 10/1989 | Ward |
| 5,050,129 A | 9/1991 | Schultz |
| 5,175,500 A | 12/1992 | McNeill |
| 5,189,644 A | 2/1993 | Wood |
| 5,210,691 A | 5/1993 | Freedman et al. |
| 5,265,192 A | 11/1993 | McCormack |
| 5,357,893 A | 10/1994 | Ruffa |
| 5,373,443 A | 12/1994 | Lee et al. |
| 5,406,206 A | 4/1995 | Safinya et al. |
| 5,467,018 A | 11/1995 | Ruter et al. |
| 5,563,513 A | 10/1996 | Tasci et al. |
| 5,594,343 A | 1/1997 | Clark et al. |
| 5,706,194 A | 1/1998 | Neff et al. |
| 5,764,515 A | 6/1998 | Guerillot et al. |
| 5,770,945 A | 6/1998 | Constable |
| 5,825,188 A | 10/1998 | Montgomery et al. |
| 5,835,883 A | 11/1998 | Neff et al. |
| 5,836,634 A | 11/1998 | Finkelman |
| 5,841,733 A | 11/1998 | Bouyoucos et al. |
| 5,884,227 A | 3/1999 | Rabinovich et al. |
| 5,905,657 A | 5/1999 | Celniker |
| 6,037,776 A | 3/2000 | McGlone |
| 6,049,760 A | 4/2000 | Scott |
| 6,088,656 A | 7/2000 | Ramakrishnan et al. |
| 6,094,400 A | 7/2000 | Ikelle |
| 6,101,448 A | 8/2000 | Ikelle et al. |
| 6,115,670 A | 9/2000 | Druskin et al. |
| 6,138,075 A | 10/2000 | Yost |
| 6,181,138 B1 | 1/2001 | Hagiwara et al. |
| 6,253,100 B1 | 6/2001 | Zhdanov |
| 6,253,627 B1 | 7/2001 | Lee et al. |
| 6,256,587 B1 | 7/2001 | Jericevic et al. |
| 6,278,948 B1 | 8/2001 | Jorgensen et al. |
| 6,304,086 B1 | 10/2001 | Minerbo et al. |
| 6,311,132 B1 | 10/2001 | Rosenquist et al. |
| 6,332,109 B1 | 12/2001 | Sheard et al. |
| 6,339,333 B1 | 1/2002 | Kuo |
| 6,393,363 B1 | 5/2002 | Wilt et al. |
| 6,424,918 B1 | 7/2002 | Jorgensen et al. |
| 6,430,507 B1 | 8/2002 | Jorgensen et al. |
| 6,466,021 B1 | 10/2002 | MacEnany |
| 6,470,274 B1 | 10/2002 | Mollison et al. |
| 6,476,609 B1 | 11/2002 | Bittar |
| 6,493,632 B1 | 12/2002 | Mollison et al. |
| 6,502,037 B1 | 12/2002 | Jorgensen et al. |
| 6,529,833 B2 | 3/2003 | Fanini et al. |
| 6,533,627 B1 | 3/2003 | Ambs |
| 6,534,986 B2 | 3/2003 | Nichols |
| 6,593,746 B2 | 7/2003 | Stolarczyk |
| 6,594,584 B1 | 7/2003 | Omeragic et al. |
| 6,671,623 B1 | 12/2003 | Li |
| 6,675,097 B2 | 1/2004 | Routh et al. |
| 6,686,736 B2 | 2/2004 | Schoen et al. |
| 6,711,502 B2 | 3/2004 | Mollison et al. |
| 6,724,192 B1 | 4/2004 | McGlone |
| 6,739,165 B1 | 5/2004 | Strack |
| 6,765,383 B1 | 7/2004 | Barringer |
| 6,813,566 B2 | 11/2004 | Hartley |
| 6,816,787 B2 | 11/2004 | Ramamoorthy et al. |
| 6,842,006 B2 | 1/2005 | Conti et al. |
| 6,842,400 B2 | 1/2005 | Blanch et al. |
| 6,846,133 B2 | 1/2005 | Naes et al. |
| 6,876,725 B2 | 4/2005 | Rashid-Farrokhi et al. |
| 6,883,452 B1 | 4/2005 | Gieseke |
| 6,888,623 B2 | 5/2005 | Clements |
| 6,901,029 B2 | 5/2005 | Raillon et al. |
| 6,901,333 B2 | 5/2005 | Van Riel et al. |
| 6,914,433 B2 | 7/2005 | Wright et al. |
| 6,950,747 B2 | 9/2005 | Byerly |
| 6,957,708 B2 | 10/2005 | Chemali et al. |
| 6,958,610 B2 | 10/2005 | Gianzero |
| 6,985,403 B2 | 1/2006 | Nicholson |
| 6,993,433 B2 | 1/2006 | Chavarria et al. |
| 6,999,880 B2 | 2/2006 | Lee |
| 7,002,349 B2 | 2/2006 | Barringer |
| 7,002,350 B1 | 2/2006 | Barringer |
| 7,023,213 B2 | 4/2006 | Nichols |
| 7,039,525 B2 | 5/2006 | Mittet |
| 7,062,072 B2 | 6/2006 | Anxionnaz et al. |
| 7,092,315 B2 | 8/2006 | Olivier |
| 7,109,717 B2 | 9/2006 | Constable |
| 7,113,869 B2 | 9/2006 | Xue |
| 7,114,565 B2 | 10/2006 | Estes et al. |
| 7,116,108 B2 | 10/2006 | Constable |
| 7,126,338 B2 | 10/2006 | MacGregor et al. |
| 7,142,986 B2 | 11/2006 | Moran |
| 7,187,569 B2 | 3/2007 | Sinha et al. |
| 7,191,063 B2 | 3/2007 | Tompkins |
| 7,203,599 B1 | 4/2007 | Strack et al. |
| 7,227,363 B2 | 6/2007 | Gianzero et al. |
| 7,236,886 B2 | 6/2007 | Frenkel |
| 7,250,768 B2 | 7/2007 | Ritter et al. |
| 7,257,049 B1 | 8/2007 | Laws et al. |
| 7,262,399 B2 | 8/2007 | Hayashi et al. |
| 7,262,602 B2 | 8/2007 | Meyer |
| 7,289,910 B2 | 10/2007 | Voutay et al. |
| 7,307,424 B2 | 12/2007 | MacGregor et al. |
| 7,337,064 B2 | 2/2008 | MacGregor et al. |
| 7,347,271 B2 | 3/2008 | Ohmer et al. |
| 7,356,412 B2 | 4/2008 | Tompkins |
| 7,362,102 B2 | 4/2008 | Andreis |
| 7,382,135 B2 | 6/2008 | Li et al. |
| 7,400,977 B2 | 7/2008 | Alumbaugh et al. |
| 7,411,399 B2 | 8/2008 | Reddig et al. |
| 7,453,763 B2 | 11/2008 | Johnstad |
| 7,456,632 B2 | 11/2008 | Johnstad et al. |
| 7,477,160 B2 | 1/2009 | Lemenager et al. |
| 7,482,813 B2 | 1/2009 | Constable et al. |
| 7,502,690 B2 | 3/2009 | Thomsen et al. |
| 7,536,262 B2 | 5/2009 | Hornbostel et al. |
| 7,542,851 B2 | 6/2009 | Tompkins |
| 7,565,245 B2 | 7/2009 | Andreis et al. |
| 7,659,721 B2 | 2/2010 | MacGregor et al. |
| 7,660,188 B2 | 2/2010 | Meldahl |
| 7,683,625 B2 | 3/2010 | Milne et al. |
| 7,822,552 B2 | 10/2010 | Bittleston |
| 7,884,612 B2 | 2/2011 | Conti et al. |
| 7,928,732 B2 | 4/2011 | Nichols |
| 8,008,920 B2 | 8/2011 | Lu et al. |
| 8,099,239 B2 | 1/2012 | MacGregor et al. |
| 8,577,660 B2 | 11/2013 | Wendt et al. |
| 8,923,094 B2 | 12/2014 | Jing et al. |
| 2002/0172329 A1 | 11/2002 | Rashid-Farrokhi et al. |
| 2005/0128874 A1 | 6/2005 | Herkenhoff et al. |
| 2005/0237063 A1 | 10/2005 | Wright et al. |
| 2006/0186887 A1 | 8/2006 | Strack et al. |
| 2007/0280047 A1 | 12/2007 | MacGregor et al. |
| 2007/0288211 A1 | 12/2007 | MacGregor et al. |
| 2008/0007265 A1 | 1/2008 | Milne et al. |
| 2008/0008920 A1 | 1/2008 | Alexandrovichserov et al. |
| 2008/0015782 A1 | 1/2008 | Saltzer et al. |
| 2008/0059075 A1 | 3/2008 | Colombo et al. |
| 2008/0105425 A1 | 5/2008 | MacGregor et al. |
| 2008/0106265 A1 | 5/2008 | Campbell |
| 2009/0005997 A1 | 1/2009 | Willen |
| 2009/0070042 A1 | 3/2009 | Birchwood et al. |
| 2009/0083006 A1 | 3/2009 | Mackie |
| 2009/0187391 A1 | 7/2009 | Wendt et al. |
| 2009/0198476 A1 | 8/2009 | Kim et al. |
| 2009/0204330 A1 | 8/2009 | Thomsen et al. |
| 2009/0243613 A1 | 10/2009 | Lu et al. |
| 2009/0306900 A1 | 12/2009 | Jing et al. |
| 2009/0309599 A1 | 12/2009 | Ziolkowski |

(56) References Cited

U.S. PATENT DOCUMENTS

| | | |
|---|---|---|
| 2010/0179761 A1 | 7/2010 | Burtz et al. |
| 2010/0307741 A1 | 12/2010 | Mosse et al. |
| 2011/0090760 A1 | 4/2011 | Rickett et al. |

FOREIGN PATENT DOCUMENTS

| | | |
|---|---|---|
| WO | WO 98/07050 | 2/1998 |
| WO | WO 2004/109338 | 12/2004 |
| WO | WO 2006/052145 | 5/2006 |
| WO | WO 2006/073315 | 7/2006 |
| WO | WO 2008/054880 | 5/2008 |
| WO | WO 2008/062024 | 5/2008 |

OTHER PUBLICATIONS

Hu, W. et al. (2009), "Joint electromagnetic and seismic inversion using structural constraints," *Geophysics* 74(6), pp. R99-R109.

DOMAIN FREEZING IN JOINT INVERSION

CROSS-REFERENCE TO RELATED APPLICATION

This application is the National Stage of International Application No. PCT/US2011/037106, that published as WO 2012/173718, filed May 9, 2012, which claims the benefit of U. S. Provisional Application No. 61/498,352, filed Jun. 17, 2011, entitled DOMAIN FREEZING IN JOINT INVERSION, the entirety of which is incorporated by reference herein.

FIELD OF THE INVENTION

This invention relates generally to the field of geophysical prospecting and, more particularly, to processing of geophysical data. Specifically, the invention is a method for performing joint inversion of two or more different geophysical data types.

BACKGROUND OF THE INVENTION

This invention pertains to joint inversion of remote geophysical data to infer geological properties of the subsurface. Remote geophysical data are likely to include active seismic reflection data; electromagnetic data (either controlled source ("CSEM") or magneto-telluric ("MT"); and/or gravity measurements; however, any type of data that can be used to remotely infer the properties of subsurface rocks in the region of interest may be included. When multiple data types (e.g. reflection seismic and electromagnetic data) are inverted simultaneously, it is known as a joint inversion. During inversion the aim is to minimize the difference between the measured data and the data predicted by the inversion model. By combining multiple different types of geophysical data in a joint inversion, one often aims to invert for a model with multiple different types of model parameters (e.g. porosity and fluid type) rather than just a single parameter (e.g. p-wave impedance).

Due to the large number of model parameters and the often large computational cost of the forward calculation ("synthesizing" the data from a test model), one is often limited to linearized, local optimization techniques for inversion. These involve starting at an initial model and updating it by moving along a path in model-parameter space that decreases the misfit between measured data and synthesized data (known as the objective function). Geophysical inversion in general, and joint inversion in particular, often has a highly non-linear objective function which can result in poor convergence properties due to the solution becoming stuck in a local minimum of the objective function.

Lack of convergence due to strong non-linearity of the inversion problem often arises in geophysical inversion due to the nature of the seismic reflection data—specifically, the relative lack of low-frequency content in the data. This problem can be mitigated to some degree by first inverting a low-pass filtered version of the data to find a long-spatial-wavelength model. Using this model as a starting model for subsequent inversions of higher-frequency data can serve to stabilize the inversion process. The technique of first inverting low-frequency portion of the seismic reflection data can be combined with inverting only the earliest portions of the recorded data first, i.e. the earliest arrivals at the detectors. By limiting the time window during the inversion, the more complicated deeper reflections, which are overprinted by multiples, can be excluded to obtain a good shallow model.

Bunks et al. describe a multiscale approach to full waveform seismic inversion. (Bunks, C., Saleck, F. M., Zaleski, S., and Chavent, G., "Multiscale seismic waveform inversion," *Geophysics* 50, 5, pp 1457-1473 (1995)) They propose to low-pass filter the seismic data and increase the model grid size in order to avoid many of the local minima normally encountered when inverting full waveform reflection seismic data. At each step, they add more frequencies to the data and reduce the grid size to realize the full resolution available in the data set. This method, however, does not describe how to stabilize a joint inversion of multiple data and parameter types.

Hu et al (2009) perform a joint inversion of electromagnetic and seismic data. (Hu, W., Abubakar, A., and Habashy, T. M., "Joint electromagnetic and seismic inversion using structural constraints," *Geophysics* 74, 6, pp R99-R109 (2009)) In order to prevent high-frequency data from dominating the inversion and thus becoming trapped in local minima, they apply a weight to the data such that lower frequency portions of the data are emphasized. The data weighting does not change during the course of the inversion. This technique does not allow one to increase the influence of higher frequency data or to alter which parameters the inversion is solving for as the solution approaches the global minimum.

SUMMARY OF THE INVENTION

In one of its aspects, the invention, with reference to the flowchart of FIG. 2, is a method for estimating geological properties in a subsurface region using multiple types of geophysical data (21). An initial physical properties model 22 is constructed. Some parameters in the model are frozen (23) and optionally portions of the model wave number and spatial domains (24) and the data frequency and data time domains (25), are also frozen. Then, a joint inversion (26) of the multiple data types is performed to calculate an update to the model only for the portions that are not frozen. The converged model (27) for this inversion is used as a new starting model, and the process is repeated (28), possibly several times, unfreezing more parameters and data each time until the desired spatial and parameter resolution (29) has been achieved. In all practical applications, joint inversion is carried out on a suitably programmed digital computer.

In one embodiment, the invention is a method for estimating a physical properties model in a subsurface region using data comprising two or more geophysical data types, said model comprising numbers in a model parameter domain representing one or more physical properties, said method comprising jointly inverting (using a computer) the data in a plurality of sequential phases, wherein in each phase until a last phase, only a portion of the data is inverted in order to infer a subset of the model's parameter domain.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DETAILED DESCRIPTION OF EXAMPLE EMBODIMENTS

Figure 1:
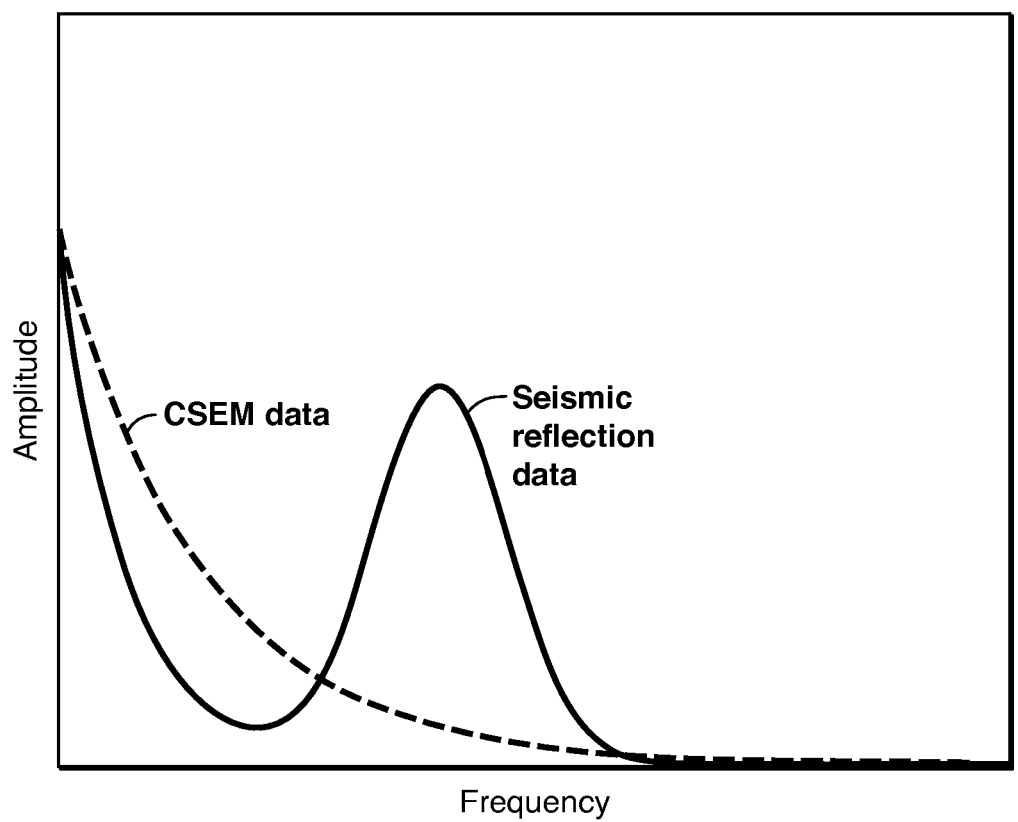
FIG. 1 illustrates the relative frequency content of data that may be used in a joint geophysical inversion, in this case reflection seismic data and CSEM data.

The present inventive method applies specifically to joint inversion. In joint inversion, the different data types often encode information about the subsurface at different wavelengths as illustrated in FIG. 1, which shows the relative frequency content of data that may be used in a joint geophysical inversion of seismic and electromagnetic data. The solid line is the frequency content of reflection seismic data and the dashed line is the frequency content of CSEM (controlled-source electromagnetic) data. This difference in frequency content can be used effectively when attempting to stabilize the inversion by using low-frequency data during the initial stages of the inversion. Also, the present inventive method goes further than simply using different parts of the data during different stages of the inversion. Particular model parameters are fixed during the inversion to improve inversion convergence by using knowledge of the physics of the model parameters and their likely effect on the non-linearity of the inverse problem.

The invention allows for robust joint inversion of geophysical data via knowledge of the frequency content of the different types of data, and the corresponding wavelengths of the different model parameters. The invention allows for a more robust inversion process by approaching the true model at longer wavelengths first before solving for model parameters expected to vary at short wavelengths.

This is accomplished by "freezing" various data and model domains of the inversion problem. In this document, freezing is defined as fixing, damping, down-weighting, or removing particular parts of the objective function pertaining to data or model parameters that might contribute to poor convergence properties during an inversion. As the solution to the inversion problem evolves towards the global minimum of the objective function, the frozen domains are gradually unfrozen; that is, they contribute more strongly to the inversion process.

By first inverting for the longer wavelength portions of the model domain, the inversion becomes more robust and less likely to become stuck in a local minimum. Once a long wavelength estimate of the model has been determined, it is effectively used as a starting model for a subsequent phase of the inversion. This next phase of the inversion (or set of iterations) solves for finer wavelength parameters in the model. The processes can continue, adding higher frequencies and solving for smaller wavelength features until the highest frequency data available has contributed to the inversion solution. At each phase, the previous solution is used as a new starting model. This is the un-freezing process.

The primary freezing domain is the model parameter domain. In many practical applications, the inversion model domain contains more than one physical parameter. For example, a geophysical joint inversion may invert for both conductivity and seismic velocity, or perhaps porosity and water saturation. If one or more of the model parameters are believed to vary on a length scale smaller than the other parameters (i.e., they vary rapidly), one can use that fact to avoid local minima by freezing the rapidly varying parameters for early stages of the inversion process.

Four other example domains are presented here as candidates to be frozen to improve joint inversion convergence. This list is not intended to be exhaustive, and further, domains may be used alone or in combination. The particular problem of interest will determine the domain(s) used, as well as the order of domain freezing in the inversion.

Data Frequency Domain: In a joint inversion each data set is likely to have a different frequency content. For example, electromagnetic data, such as controlled source electromagnetic (CSEM) or magnetotelluric (MT) data has a lower frequency content than seismic reflection data. The high frequency nature of the seismic reflection data (and specifically the lack of intermediate and low frequencies) often cause the inversion to suffer from local minima problems. By low-pass filtering the higher frequency data sets so that all data contribute to model resolution at similar wavelengths, we can avoid local minima of the inversion objective function. After solving for a long wavelength model, we can gradually thaw (add back in) higher frequency portions of the filtered data sets.

Data Time Domain: Multiples and converted waves in the inversion of seismic reflection data make the problem very nonlinear. To avoid these late-arriving phases in the initial steps of the inversion, one can limit the time window to the early portion of the seismograms. This restricts the inversion to the shallow part of the model and it is better behaved due to the lack of multiples and reduced parameter space. Having a more accurate solution for the shallow part of the model will aide the inversion of the deeper portions of the model, which correspond to times in the data that include multiples and converted waves from the shallow part of the model.

Wave Number Domain: Local minima in the geophysical joint inversion processes are directly related to short-wavelength features of the model being mislocated in the physical model space. Because of this, the freezing of short-wavelength features in the model domain can improve inversion stability. This can be achieved by increasing the grid size of the physical model, i.e. completely disallowing small-wavelength features in the inversion model during early steps. This can also be achieved by using a spatial smoothing constraint on the inversion that penalizes small-wavelength fluctuations in the model.

Spatial Domain: Spatial masks can be applied to the model domain. For example, one could freeze deeper portions of the model during early stages of the inversion. After finding a solution for the shallow portion of the model, the deeper portions are then solved. Alternatively, regions of the model that vary rapidly (for example, near faults or major lithologic boundaries) may be frozen until large-scale structure is obtained.

Figure 2:
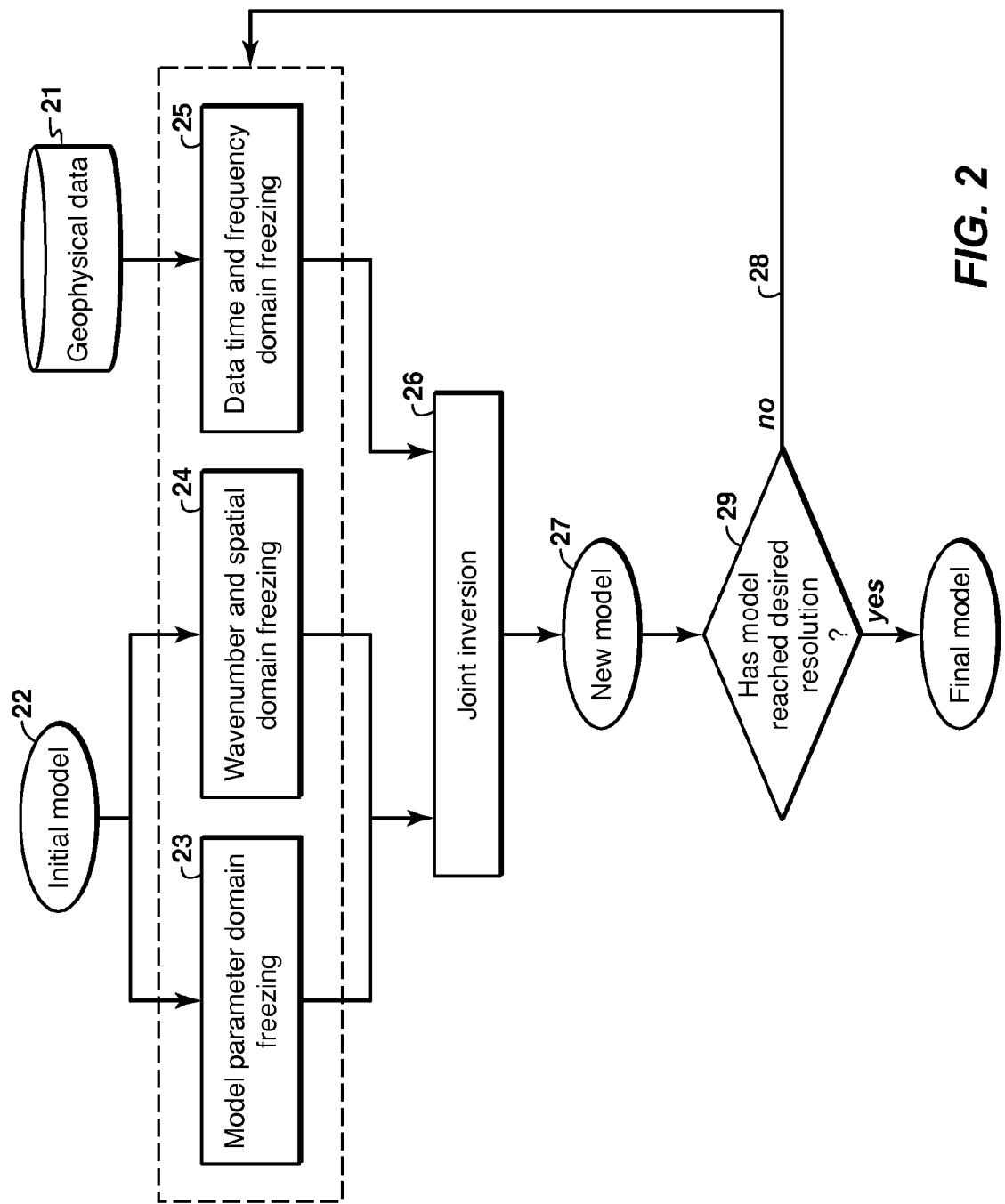
FIG. 2 is a flow diagram showing how the general domain freezing process of the present invention may fit into a typical joint inversion scheme.

In general, the invention may be applied successfully in any generic inversion workflow, as illustrated in the flowchart of FIG. 2. Further, different benefits may be obtained using different solvers. For example, while these techniques mitigate local minima in gradient-based solvers, they also can drastically reduce computational expense in stochastic or genetic algorithms by substantially reducing the scope of model parameter space searched in each phase of the inversion.

Figure 3:
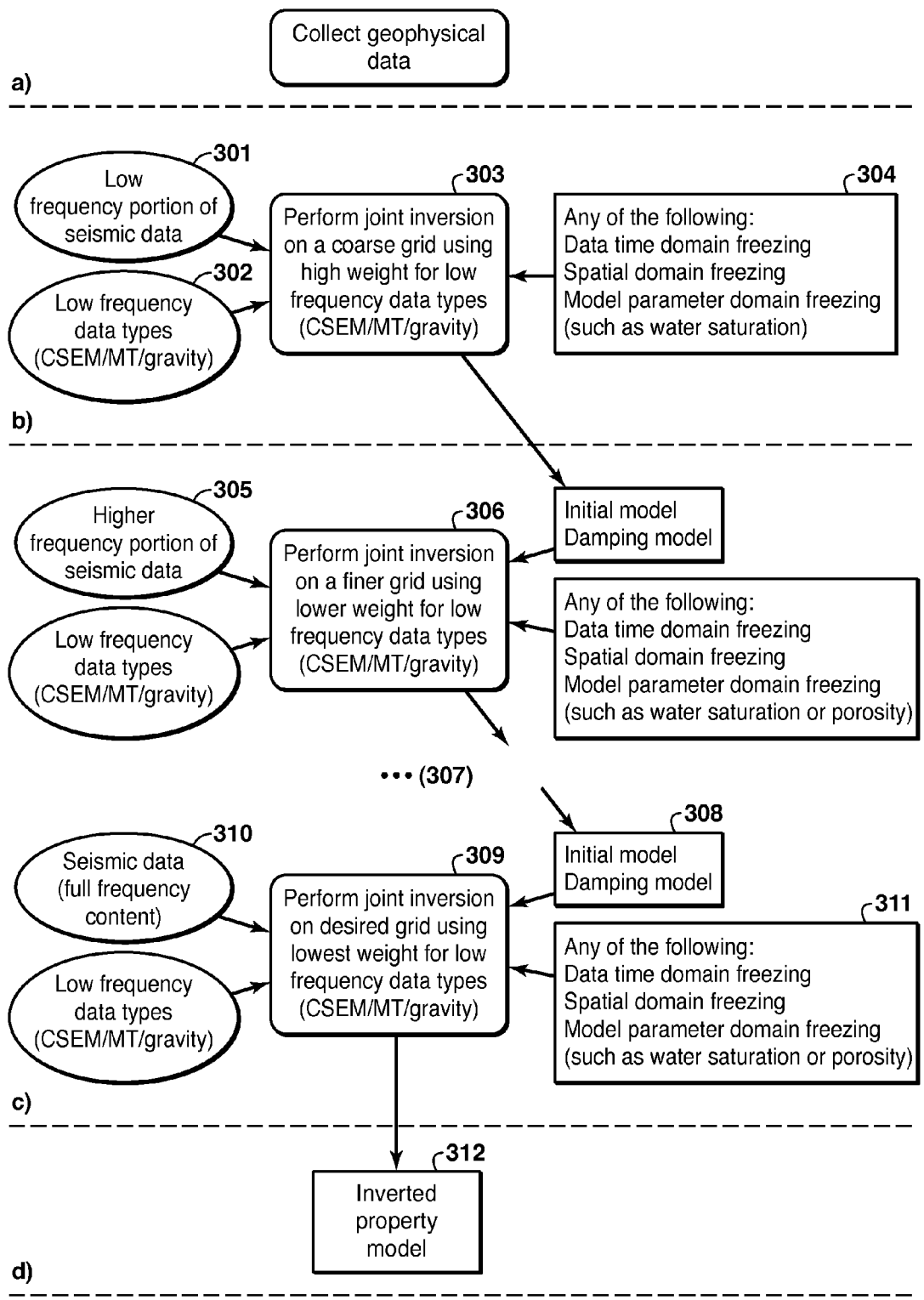
FIG. 3 is a flow diagram showing basic steps in one embodiment of the present inventive method.

FIG. 3 illustrates an embodiment of the invention that jointly inverts multiple geophysical data types in multiple phases by domain freezing. In this example, it is assumed that rock physics relationships are used to link the different data types. However, the present invention is not concerned with the type of coupling between data types that is used to make the inversion joint.

In the phase labeled (a) in FIG. 3, geophysical data are collected or otherwise obtained. The data might include at least two of active seismic reflection and/or refraction, controlled source electromagnetic, MT, and gravity data, each acquired over the same region of interest.

In phase (b), only the low frequency information of seismic data 301, as obtained by low pass filtering or any other mathematical transformation that eliminates high frequencies, is inverted together with naturally low frequency data 302, such as CSEM, MT or gravity (frequency domain freezing). Because only low frequencies are used, the inversion is performed on a coarse grid 303 (wavenumber domain freezing). Furthermore, any of several other types of domain freezing 304 can be used in phase (b). Simplified rock physics relationships—possibly implemented by fixing or strongly damping one or more inversion partameters—can be used in this phase (model parameter domain freezing). For example, if water saturation were an inversion parameter, one could fix the water saturation in this phase because large scale fluctuations of water saturation are not expected. Further reduction of free model parameters that are inverted for can be achieved by fixing or strongly damping portions of the model space (spatial domain freezing), or the data time domain by applying a taper to the seismic data.

Phase (b) can consist of multiple sub-phases, for example starting by inverting only the early arrivals and in the following phases include information arriving later in time. (In the claims appended hereto, the prefix "sub" is omitted and each one of multiple sub-phases is referred to as a "phase." Each "phase" is defined by completion of a joint inversion process, which means in the case of iterative inversion, satisfying a convergence criterion.) The final result of phase (b) is a coarsely sampled model space containing information only at low wavenumbers.

In phase (c), the frequency content of the seismic data is increased 305 and the grid size decreased 306 over several stages 307 until frequency content is used together with the desired grid in the final stage 310. The model obtained in each previous sub-phase is used as initial model 308. Furthermore the model may also be used to add an additional damping constraint for regularization. The low frequency data are still inverted jointly with the seismic data, but their contribution to the objective function is decreased 309 as the grid size decreases (data frequency domain freezing). This weighting scheme enables the low frequency data to inherit the resolution of the high frequency data while stabilizing the inversion. The damping at each sub-phase 308 can be increased to ensure that only information at smaller scale length is changed. Furthermore, the complexity of the link between the data types is increased. For example by increasing the number of rock physics parameters to invert for or by decreasing the damping of portions of the rock physics domain. Again, spatial masks, which can change as a function of iteration, can be applied 311 to the model space to reduce the model parameters that are inverted for in each sub-phase.

The workflow is stopped at phase (d) once no more information can be added and the highest resolution is achieved. Reservoir properties 312 (porosity, lithology, fluid type) are the result of the inversion. Other products may be Vp, Vs, density and resistivity, all of which inherited the high spatial resolution of the seismic data.

For hydrocarbon detection, an additional phase can be added at the end. In this phase all parameters except the water saturation are fixed. A very strong damping may be used to the model resulting at 312, and the weights of the data containing information about resistivity (CSEM, MT) and thus water saturation are increased strongly compared to the seismic data. This utilizes the information about water saturation contained in these data types and only allows changes to the model if required by these data. The strong damping prevents a potential loss of resolution due to the large weight of the low frequency data (like CSEM and MT).

For hydrocarbon exploration, a re-gridding of the water saturation can be performed. All layers identified as sand are gridded into one layer. Alternatively a constraint can be added allowing each sand layer to have only one value for the water saturation (thus the same for each layer inside the sand).

EXAMPLES

Figure 4:
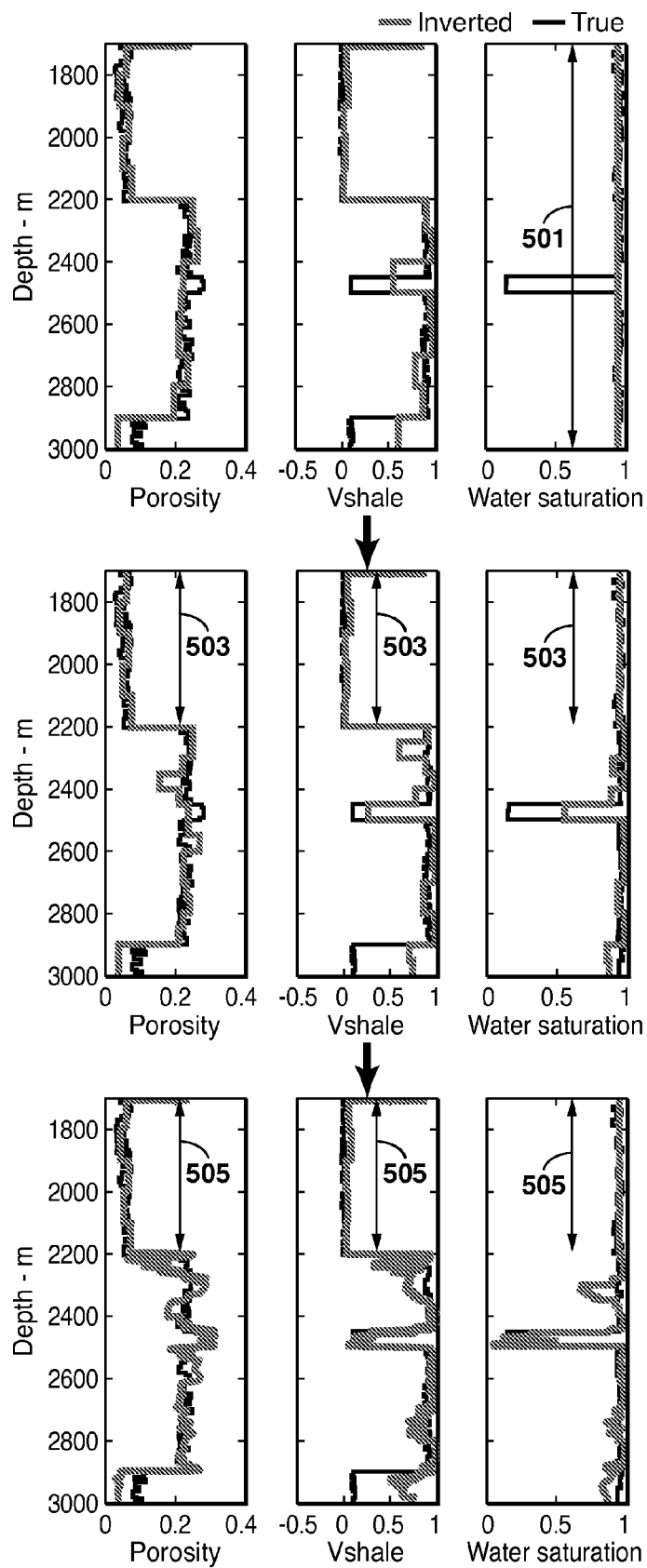
FIG. 4 illustrates a test example of the present invention.
Figure 4:
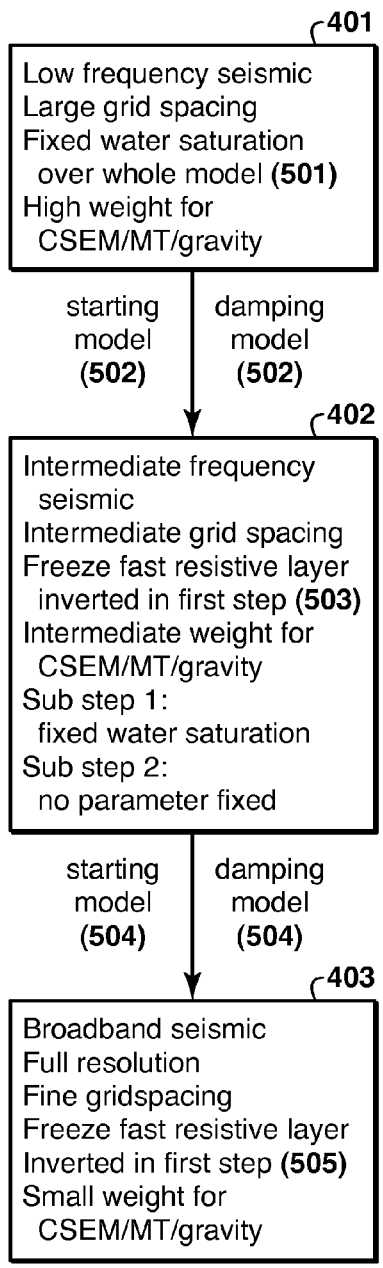

FIG. 4 illustrates an embodiment of the invention such as that illustrated in FIG. 3 applied to an image problem of a shallow body that has fast seismic velocities and large resistivity. The data used are seismic reflection (amplitude and travel times), CSEM, MT, and gravity. The data are coupled using a rock physics model described by porosity, shale volume fraction ("Vshale"), and water saturation. On the right side of the drawing, 1D models of the three geological properties are shown at the completion of each of the three phases (a)-(c) from FIG. 3.

In the first phase (a), as stated at 401, the seismic data are low-pass filtered with a corner frequency of 10 Hz and the inversion is performed on a coarse grid. The low frequency data are added using a large weight and the water saturation is fixed as indicated by the arrow 501.

In the next phase (b), as stated at 402, more frequencies are added to the seismic data and the inversion is performed on finer grids. The solution from phase (a) is used as a starting model (interpolated on the finer grid) and a damping term is added in the objective function (502). Because the reflections from the shallow, fast, and reflective body dominate the misfit, that portion of the model (503) is kept fixed in subsequent phases. In a first sub-phase the water saturation is fixed, in the second it is allowed to change via the inversion process.

In phase (c), as stated at 403, the inversion is performed using the full resolution of the seismic data and the model from phase (b) as starting model and model to damp against (504). The portion of the model corresponding to the fast and resistive layer (505) is kept fixed and the weight of the low frequency data is decreased.

The progressive convergence of the inverted parameters (gray lines) to the "true" parameters (dark black lines) through the three phases (a) to (c) are shown as the 1D models are viewed from top to bottom.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented method for estimating a physical properties model in a subsurface region using data comprising two or more geophysical data types, said model comprising numbers in a model parameter domain representing one or more physical properties, said method comprising:

using a computer to jointly invert the data in a plurality of sequential phases, wherein in each phase until a last phase, only a portion of the data is inverted in order to infer a subset of the model's parameter domain, said portion being determined at least partly based on relative frequency content of the two or more data types, wherein in a first phase of the sequential phases, the portion of the data inverted is longer wavelength data from the data's frequency domain, and model parameters expected to vary at shorter wavelengths are frozen, further comprising, between said first phase and said last phase, one or more intermediate phases, each intermediate phase and the last phase progressively using more of the data frequency domain and inferring more of the model parameter domain, and wherein a last of the plurality of sequential phases yields a final subsurface physical property model that provides reservoir properties for the subsurface region; and prospecting for hydrocarbons with the reservoir properties of final subsurface physical property model.

2. The method of claim 1, wherein a converged model from one phase is used as a starting model, or a damping model, or both, for a next phase.

3. The method of claim 1, wherein the intermediate phases is topped when a pre-selected spatial and parameter resolution is reached.

4. The method of claim 1, wherein the joint inversion takes place in an inversion domain comprising, in addition to the model parameter domain and the data frequency domain, one or more of a data time domain, model wave number domain, and a model spatial domain.

5. The method of claim 4, further comprising, between said first phase and said last phase, one or more intermediate phases, each intermediate phase and the last phase progressively unfreezing more of:

the model parameter domain, the model spatial domain, or the model wave number domain; and the data frequency domain or the data time domain.

6. The method of claim 5, wherein as the sequential phases progress, one or more of the following occurs:

the model wave number domain moves from a coarser inversion grid to a finer inversion grid;

the data time domain moves from only earlier arrivals to including later arrivals;

the model spatial domain moves from freezing deeper portions of the model to solving for the deeper portions, or from freezing regions of the model expected to vary rapidly to solving for such rapidly varying regions;

the model parameter domain moves from freezing model parameters for a physical property expected to vary at shorter wavelengths to solving for model parameters for the physical property expected to vary at shorter wavelengths and four model parameters and for model parameters for any other of said one or more physical properties; and the data frequency domain progresses from lower frequency data to include higher frequency data, which is accomplished by using a filter or by selecting from among the two or more data types by frequency content.

7. The method of claim 6, wherein the selecting from among the two or more data types by frequency content is accomplished by adjusting weights in an objective function used in the joint inversion to measure misfit between measured data and model-predicted data, said objective function having a term for each of the two or more data types, each term containing an adjustable weight.

8. The method of claim 7, wherein the two or more geophysical data types are selected from a group consisting of active seismic reflection data, a high-frequency data type; electromagnetic data, either controlled source or magneto-telluric, both low-frequency data types; and gravity measurements, also a low-frequency data type.

9. The method of claim 8, wherein the weight for a low-frequency data type is progressively decreased at each successive phase of the joint inversion through said last phase.

10. The method of claim 9, wherein the two or more geophysical data types are seismic data and either electromagnetic or magneto-telluric data, the physical properties are rock porosity, lithology, and water saturation, lithology being parameterized as shale volume fraction, and model parameters for water saturation are frozen through said last phase of the joint inversion, further comprising an additional phase after said last phase during which all model parameters except for water saturation are fixed, a strong damping is applied constraining the model to agree with a starting model obtained from the last phase of the joint inversion, and a large weight is given to the electromagnetic or magneto-telluric data compared to the seismic data.

11. The method of claim 1, wherein the one or more physical properties are rock porosity, lithology, and water saturation, lithology being parameterized as shale volume fraction, and each sand layer or interval identified during the joint inversion is assigned a single value for water saturation.

12. The method of claim 1, wherein the one or more physical properties include water saturation, and the model parameters for water saturation are frozen for at least a first phase of said plurality of sequential phases.

13. The method of claim 1, wherein in each phase of the plurality of sequential phases, the portion of the data inverted corresponds to a selected frequency band.

* * * * *